(12) United States Patent
Kakadia et al.

(10) Patent No.: US 10,277,487 B2
(45) Date of Patent: Apr. 30, 2019

(54) SYSTEMS AND METHODS FOR MAINTAINING NETWORK SERVICE LEVELS

(71) Applicant: Google Inc., Mountain View, CA (US)

(72) Inventors: Deepak Kakadia, Santa Clara, CA (US); Muhammad Naeem, San Jose, CA (US)

(73) Assignee: Google LLC, Mountain View, CA (US)

( * ) Notice: Subject to any disclaimer, the term of this patent is extended or adjusted under 35 U.S.C. 154(b) by 700 days.

(21) Appl. No.: 14/879,655

(22) Filed: Oct. 9, 2015

(65) Prior Publication Data

US 2017/0104651 A1 Apr. 13, 2017

(51) Int. Cl.
*G06F 15/173* (2006.01)
*H04L 12/26* (2006.01)
(Continued)

(52) U.S. Cl.
CPC ...... *H04L 43/0823* (2013.01); *H04L 12/2854* (2013.01); *H04L 41/0609* (2013.01); *H04L 41/0631* (2013.01); *H04L 43/04* (2013.01)

(58) Field of Classification Search
CPC . H04L 43/0823; H04L 12/2854; H04L 43/04; H04L 41/0609; H04L 41/0631
(Continued)

(56) References Cited

U.S. PATENT DOCUMENTS 5,872,911 A 2/1999 Berg
7,383,191 B1 6/2008 Herring et al.
(Continued)

FOREIGN PATENT DOCUMENTS

| EP | 2933954 A1 | 10/2015 |
|---|---|---|
| WO | 2012041555 A1 | 4/2012 |
| WO | 2014108029 A1 | 7/2014 |

OTHER PUBLICATIONS

Extended European Search Report dated Feb. 15, 2017 in European Patent Application No. 16192858.5 (8 pages).
(Continued)

*Primary Examiner* — Ario Etienne
*Assistant Examiner* — Sahera Halim
(74) *Attorney, Agent, or Firm* — McDermott Will & Emery LLP

(57) ABSTRACT

Described are methods and system for maintaining network service levels. In general, the system identifies, using records of network incidents, a first plurality of network incidents occurring over a first portion of a measurement period and a second plurality of network incidents occurring over a subsequent second portion of the measurement period. The system then determines a plurality of remaining incidence tolerance limits based on an impact of the first and second pluralities of network incidents on corresponding sets of incidence tolerance limits for the measurement period, generates severity metric values for at least a subset of the second network incidents based on aggregate impact characteristics of one or more of the second plurality of network incidents weighted by remaining incidence tolerance limits associated with each of the second network incidents in the subset of the second network incidents, and selects one or more network incidents for remediation.

20 Claims, 7 Drawing Sheets

(51) Int. Cl.
*H04L 12/24* (2006.01)
*H04L 12/28* (2006.01)

(58) Field of Classification Search
USPC .......................................... 709/224, 223, 225
See application file for complete search history.

(56) References Cited

U.S. PATENT DOCUMENTS

| | | | |
|---|---|---|---|
| 7,822,837 | B1 | 10/2010 | Urban et al. |
| 8,073,721 | B1 | 12/2011 | Lewis |
| 9,077,614 | B2 | 7/2015 | Sumanth |
| 9,680,722 | B2* | 6/2017 | Zee .......................... H04L 43/08 |
| 2013/0219053 | A1* | 8/2013 | Quade ................. H04L 41/0604 |
| | | | 709/224 |
| 2014/0172842 | A1 | 6/2014 | Sumanth |

OTHER PUBLICATIONS

Office Action dated Nov. 8, 2017 in European Patent Application No. 16192858.5.
Claudio Bartolini et al., "Business Driven Prioritization of Service Incidents", HP Laboratories, Palo Alto, to be published in and presented at the 15th IFIP/IEEE Distributed Systems: Operations and Management, Nov. 15-17, 2004, Davis, CA, pp. 1-13.
Phillipa Gill et al., "Understanding Network Failures in Data Centers: Measurement, Analysis, and Implications", SIGCOMM'11, Toronto, Onario, Canada (Aug. 15-19, 2011), pp. 1-12.
Office Action dated Jul. 16, 2018 in European Patent Application No. 16192858.5.

* cited by examiner

300

| | 312 | 316 | 322 | 332 | 352 |
|---|---|---|---|---|---|
| | Source | Dest. | SLO | Service | Time |
| 372 | ##.#.#.## | ##.#.#.## | ~~~~~ | ~~~~~~ | ##### |
| | ##.#.#.## | ##.#.#.## | ~~~~~ | ~~~~~~ | ##### |
| | ##.#.#.## | ##.#.#.## | ~~~~~ | ~~~~~~ | ##### |
| | ##.#.#.## | ##.#.#.## | ~~~~~ | ~~~~~~ | ##### |
| | ... | ... | ... | ... | ... |
| | ##.#.#.## | ##.#.#.## | ~~~~~ | ~~~~~~ | ##### |

| | 314 | 318 | 324 | 334 | 340 | 354 | 356 |
|---|---|---|---|---|---|---|---|
| | Source | Dest. | SLO Level | Serv. Agg. | Count | Start | End |
| 374 | ~~~~ | ~~~~ | ~~~~ | ~~~~~ | ### | ##### | ##### |
| | ~~~~ | ~~~~ | ~~~~ | ~~~~~ | ### | ##### | ##### |
| | ~~~~ | ~~~~ | ~~~~ | ~~~~~ | ## | ##### | ##### |
| | ~~~~ | ~~~~ | ~~~~ | ~~~~~ | ## | ##### | ##### |
| | ... | ... | ... | ... | ... | ... | ... |
| | ~~~~ | ~~~~ | ~~~~ | ~~~~~ | # | ##### | ##### |

Figure 3B

SYSTEMS AND METHODS FOR MAINTAINING NETWORK SERVICE LEVELS

BACKGROUND

Information is transmitted over computer networks. The information is represented as bits grouped into packets. The packets are passed from network device to network device, e.g., switches and routers, propagating the information through the computer networks. Each packet is transmitted from its source towards a destination specified by header information in the respective packet. The source and destination of a packet may respectively be in different portions of the network, each portion operated by a different party. There may be multiple possible routes between the source and destination.

A wide area network ("WAN"), such as the Internet, can include multiple sub-networks known as autonomous systems ("AS"). An autonomous system is a portion of the network that appears to other portions of the network as though it has unified administration of a single routing policy and presents, to the other portions of the network, a consistent picture of reachable network destinations, e.g., as network address spaces reachable through the AS. In some instances, an autonomous system can be identified by an autonomous system number ("ASN") that is unique within the network. Typically, an operator of an autonomous system has agreements with third-parties for allowing data to be carried on one or more autonomous systems controlled by the respective third-party, usually under a "settlement" agreement for transit billed by usage or as a "settlement-free" peering agreement. Data may then be transmitted from one autonomous system to another at a peering point, a multi-homed network device, an Internet eXchange Point ("IXP"), or the like, within the confines of the agreements between autonomous system operators. Network devices in the WAN can then communicate across a network route that may span multiple autonomous systems.

SUMMARY

In some aspects, the disclosure relates to a method for maintaining network service levels. The method includes identifying a first plurality of network incidents occurring over a first portion of a measurement period and identifying a second plurality of network incidents occurring over a second portion of the measurement period occurring after the first portion of the measurement period. The method includes determining a plurality of remaining incidence tolerance limits based on an impact of the first and second pluralities of network incidents on corresponding sets of incidence tolerance limits for the measurement period. The method includes generating severity metric values for at least a subset of the second network incidents based on aggregate impact characteristics of one or more of the second plurality of network incidents weighted by remaining incidence tolerance limits associated with each of the second network incidents in the subset of the second network incidents. The method includes then selecting at least one of the incidents in the subset of the second network incidents for remediation.

In some aspects, the disclosure relates to a system for maintaining network service levels. The system includes a computer-readable memory storing records of network incidents and one or more processors configured to access the computer-readable memory and to execute instructions that, when executed by a processor, cause the processor to identify, using the records of network incidents stored in the computer-readable memory, a first plurality of network incidents occurring over a first portion of a measurement period and to further identify a second plurality of network incidents occurring over a second portion of the measurement period occurring after the first portion of the measurement period. The instructions, when executed, further cause the processor to determine a plurality of remaining incidence tolerance limits based on an impact of the first and second pluralities of network incidents on corresponding sets of incidence tolerance limits for the measurement period, to generate severity metric values for at least a subset of the second network incidents based on aggregate impact characteristics of one or more of the second plurality of network incidents weighted by remaining incidence tolerance limits associated with each of the second network incidents in the subset of the second network incidents, and to select at least one of the incidents in the subset of the second network incidents for remediation.

BRIEF DESCRIPTION OF THE DRAWINGS

The above and related objects, features, and advantages of the present disclosure will be more fully understood by reference to the following detailed description, when taken in conjunction with the accompanying figures, wherein:

FIG. 3A is an example table representative of service level incident records;

FIG. 3B is an example table representative of aggregations of service level incident records;

For purposes of clarity, not every component may be labeled in every figure. The drawings are not intended to be drawn to scale. Like reference numbers and designations in the various figures indicate like elements.

DETAILED DESCRIPTION

Figure 1:
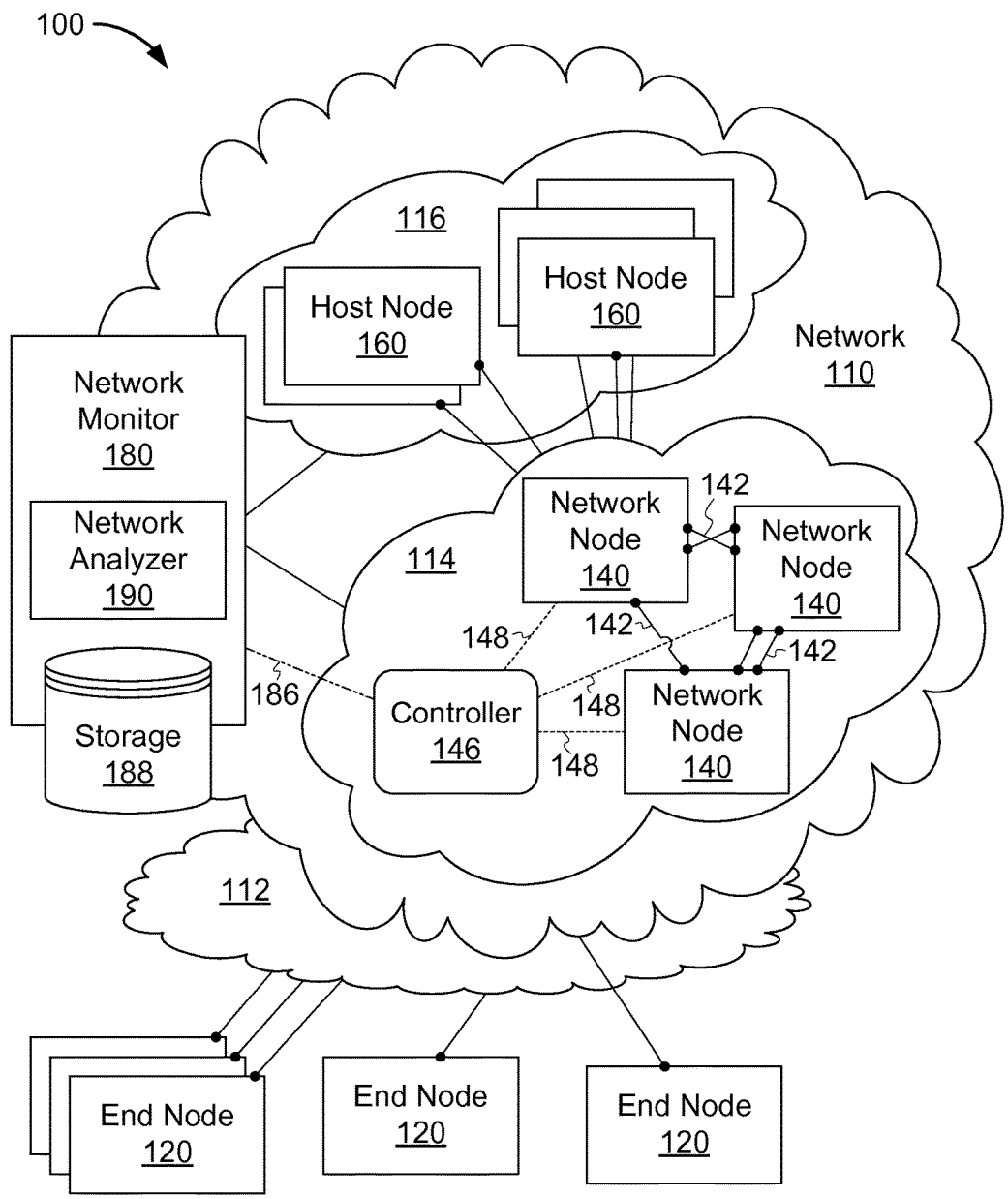
FIG. 1 is a block diagram of an example network environment.

Computing devices communicate across a network route that may span multiple autonomous systems ("AS"). An AS network, or a portion of an AS network referred to as a subnet, provides services to various network customers under a variety of contexts, including but not limited to data services networks, access networks, transmission networks, and multi-tenant networks (e.g., computing "clouds," hosted computing services, and network as a service). Network administrators make commitments to their customers guaranteeing certain levels of service to be provided by the network. These service level agreements ("SLA") define one or more service level objectives ("SLO") for network uptime and quality (e.g., bandwidth, latency, etc.). Generally, the SLA is a contractual limitation on the tolerance for incidents that will inevitably occur interrupting or degrading network service. However, it can be difficult to determine whether a network incident, or group of incidents, has sufficient impact on the service level objectives to violate an SLA until well after the SLA has been violated.

As described herein, a network administrator may use a service monitor to track service level incidents ("SLI"). For example, an administrator may use an SLO correlation tool that identifies incidents in which a software defined network ("SDN") controller refuses to allocate resources to a new communication flow, e.g., because the network capacity was insufficient to support the requirements of the new flow at the time of the request. Any one such refusal is unlikely to result in an SLA violation. However, repeated refusals may lead to an SLA violation. In some implementations, an SLI occurs whenever a communication flow encounters network congestion. Some communication protocols implement a congestion notification protocol and a service monitor may detect or be notified of flows in which the congestion notification protocol indicates congestion. For example, the Transmission Control Protocol ("TCP") has header bits reserved for Explicit Congestion Notification ("ECN"), and a monitor can record an SLI whenever a flow includes packets with the ECN bits set to indicate congestion. As another example, in some implementations, an SLA includes minimum requirements for values of one or more metrics for communication quality averaged over a fixed or sliding period of time. Communication through a network may be measured using one or more metrics, including, e.g., bandwidth, throughput, and goodput, as described in more detail below. Service level incidents may include, for example, incidents in which a network link is unavailable, a network flow is rejected or interrupted, a network flow encounters network congestion, and/or incidents in which a value for a metric of network communication quality surpasses or falls below a threshold.

SLA violations can be predicted, and prevented, before they occur by closely monitoring SLI. For example, as described herein, a monitor or network analyzer can gather SLI records from one or more monitoring tools, filter out some of the records according to various criteria, and identify significant SLIs from the remaining records. In some implementations, each SLI is assigned an importance weight based, e.g., on an impact of the corresponding incident. For example, in some implementations, an SLA includes a level of tolerance for network failures over a period of time. If a service level incident occurs near the end of the period it may be weighted higher or lower based on whether previous incidents have impacted the level of tolerance. That is, for example, if a particular SLA allows for seven hours of downtime per month, then a few seconds of downtime near the end of a month may be weighted lower if there has been minimal downtime that month and weighted higher if there has been extensive downtime closing in on, or exceeding, the seven tolerated hours that month. The monitor or network analyzer can then identify one or more particular incidents where corrective action will have the highest benefit to preventing SLA violations. The cause of these particular incidents can be identified for remediation. Predicting and preventing these SLA violations can improve operation of the network by maintaining network service levels.

FIG. 1 is a block diagram of an example network environment 100. In broad overview, FIG. 1 depicts multiple end nodes 120 configured for communication with various host nodes 160 through a network 110. While the Internet is a good example of a large network 110, this description is equally applicable to other networks as well. As shown, the end nodes 120 access the network 110 via a network portion 112 that can be, for example, a portion of the network 110, an access network (e.g., an Internet Service Provider ("ISP")), a transmission network, or any other network facilitating communication between the end nodes 120 and the host nodes 160. As shown in FIG. 1, the network 110 includes network portions 114 and 116. Each of the network portions 112, 114, and 116, are illustrative network regions and may be parts of the same autonomous system, may be distinct autonomous systems, or may include multiple autonomous systems. The network portion 114 includes various network nodes 140 through which data is passed between the end nodes 120 and the host nodes 160. Some implementations may benefit from use of a software-defined network ("SDN") in which data forwarding devices are remotely controlled by one or more network controllers. Accordingly, while not required in some implementations, the network portion 114 is illustrated as an SDN in which the network nodes 140 are data forwarding devices remotely controlled by one or more network controllers 146. The network portion 116 includes the host nodes 160, representative of, for example, host devices within one or more data centers or service centers.

FIG. 1 also illustrates a network monitor 180 situated in the network 110 with the ability to monitor, directly or indirectly, service level incidents ("SLI") that occur within the scope of the network 110. The network monitor 180 uses one or more storage devices 188 to maintain records of the SLI. Although only one network monitor 180 is shown, some implementations use multiple network monitors 180 distributed throughout the network 110. In some such implementations, the distributed network monitors 180 share the one or more storage devices 188. A network analyzer 190 accesses and analyzes SLI records stored in the one or more storage devices 188. In some implementations, the network monitor 180 is, or includes, the network analyzer 190. In some implementations, the network analyzer 190 is separate and distinct from the network monitor 180.

Figure 7:
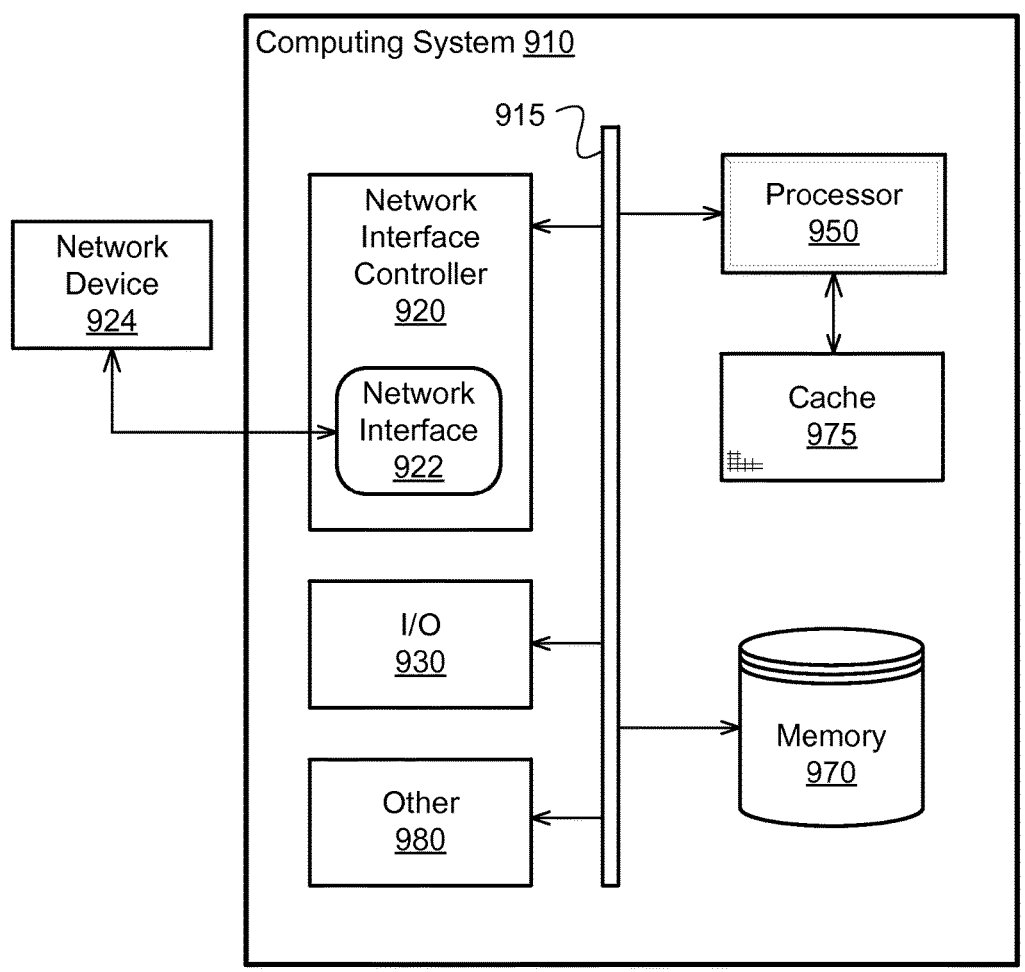
FIG. 7 is a block diagram of a computing system suitable for use in the various implementations described.

The end nodes 120 and host nodes 160 illustrated in FIG. 1 are participants in various data communications through the network environment 100. An end node 120 and host node 160 may each be, for example, a computing system 910 as shown in FIG. 7 and described below. For example, a host node 160 may be a computing system providing a service and an end node 120 may be a computing system consuming the service. A host node 160 may transmit data to an end node 120, which then acts as a sink for the transmitted data. Likewise, an end node 120 may transmit data to a host node 160, which then acts as a sink for the transmitted data. An end node 120 and a host node 160 may alternate between sending and receiving data. For example, an end node 120 may send a request for data to a host node 160 and a host node 160 may respond to the request by providing data. In some instances, multiple end nodes 120 and/or multiple host nodes 160 may participate in an exchange of data. A host node 160 may act as an intermediary between multiple end nodes 120, e.g., as a communication facilitator. Each end node 120 and host node 160 may fill any number of roles. However, in each such capacity, end nodes 120 and host nodes 160 participate in communications transmitted via the network environment 100. A communication between an end node 120 and a host node 160 can be structured as a flow of data packets, e.g., in the form of data packets in accordance with an Internet Protocol such as IPv4 or IPv6. A flow may use, for example, an Open Systems Interconnection ("OSI") layer-4 transport protocol such as the Transmission Control Protocol ("TCP") or the Stream Control Transmission Protocol ("SCTP"), transmitted via the networks 110, 112, 114, and 116 over IP.

An end node 120 may be a laptop, desktop, tablet, electronic pad, personal digital assistant, smart phone, video game device, television, television auxiliary box (also known as a "set-top box"), kiosk, portable computer, or any other such device. An end device 120 may be capable of presenting content to a user or facilitating presentation of content to a user. In some implementations, an end device 120 runs an operating system that manages execution of software applications on the end device 120. In some such implementations, the operating system is provided with the end device 120 by the manufacturer or a distributor. Applications execute within a computing context controlled by the operating system, i.e., "on top" of the operating system. Applications may be natively installed with the operating system, or installed later, e.g., by a distributor or user. In some implementations, the operating system and/or the applications are embedded, e.g., encoded in read-only memory, within the end device 120.

A host node 160 may be a computer providing a service to other host nodes 160 or to end nodes 120. For example, a host node 160 may be an e-mail server, a file server, a data cache, a name server, a content server, a data relay, a web-page server, or any other network service host. In some implementations, one or more host nodes 160 are part of a content delivery network ("CDN"). Although shown only in network portion 116, host nodes 160 may be distributed throughout the network environment 100.

The network environment 100 includes network portions 110, 112, 114, and 116 through which end nodes 120 and host nodes 160 exchange information. The network portions 110, 112, 114, and 116 may be under unified control, e.g., as parts of the same AS network, or may be under disparate control. Each network portion 110, 112, 114, and 116 is composed of various network devices (e.g., network nodes 140) linked together to form one or more communication paths (e.g., data links 142) between participating devices. For example, network nodes 140 are illustrated in the network portion 114 with interconnecting-links 142 forming a data plane. Each network node 140 includes at least one network interface for transmitting and receiving data over a connected data plane link 142, collectively forming the network. In some implementations, the network device 730 shown in FIG. 6 and described below is suitable for use as a network node 140.

The network environment 100, including the various network portions 110, 112, 114, 116, may be composed of multiple networks, which may each be any of a local-area network (LAN), such as a corporate intranet, a metropolitan area network (MAN), a wide area network (WAN), an inter-network such as the Internet, or a peer-to-peer network, e.g., an ad hoc WiFi peer-to-peer network. The data links between devices may be any combination of wired links (e.g., fiber optic, mesh, coaxial, Cat-5, Cat-5e, Cat-6, etc.) and/or wireless links (e.g., radio, satellite, or microwave based). The network portions 112 and 114 are illustrated as parts of a larger network portion 110, in keeping with examples in which the network monitor 180 is responsible for the network 110; however, the network portions 110, 112, 114, and 116 may each be public, private, or any combination of public and private networks. The networks may be any type and/or form of data network and/or communication network.

In some implementations, one or more of the network portions 110, 112, 114, or 116 are implemented using network function virtualization ("NFV"). In an NFV network, some network functionality normally implemented in a network device 140 is implemented as software executing on a processor (e.g., a general purpose processor). In some implementations, this virtualized network functionality includes one or more of load balancing, access control, firewall, intrusion detection, and routing. Other network functionality may also be virtualized in this manner. In some implementations, the virtualized network functionality includes functionality for reporting network metrics, network interruptions, and other indicators of SLIs to a network monitor 180.

In some implementations, one or more network portions 110, 112, 114, and 116 are a software-defined network ("SDN") in which data forwarding devices (e.g., network nodes 140) are controlled by remote network controllers 146 separate from the data forwarding devices, e.g., as shown with respect to network portion 114. In some such implementations, the SDN network nodes 140 are controlled by one or more SDN controllers 146 via control plane links 148 distinct from, and thus out-of-band from, the data plane links 142. In some implementations, SDN network nodes 140 are controlled via in-band data plane links 142 or via a hybrid combination of in-band data plane links 142 and out-of-band control plane links 148. In some implementations of an SDN network, multi-packet data transmissions flow through the network on assigned routes. When an SDN data forwarding device receives a packet for an unrecognized flow, the data forwarding device assigns, or requests a controller to assign, a route to the new flow. Each subsequently received packet for the flow is then forwarded along the same route by the data forwarding device. In some implementations, the SDN controller 146 selects a route for a new flow based on criteria associated with the flow, e.g., based on requirements associated with an OSI layer-7 application protocol identified in the flow. For example, a flow for Voice over IP ("VoIP") may require low network latency, whereas a flow for the File Transfer Protocol ("FTP") may tolerate higher latency, and the controller 146 accordingly prioritizes directing VoIP traffic over low latency routes. In some implementations, if the controller 146 is unable to identify a suitable route for the new flow, then it rejects the flow. Rejecting the flow may constitute a service level incident. In some implementations, the controller 146 reports the rejection of the new flow to the network monitor 180, e.g., via link 186. In some implementations, the link 186 is part of the control plane. In some implementations, the link 186 is part of the data plane. In some implementations, the SDN controller 720 shown in FIG. 6 and described below is suitable for use as a network controller 146.

The network environment 100 includes one or more network monitors 180. In some implementations, a network monitor 180 is a hardware device including one or more computing processors, memory devices, network interfaces, and connective circuitry. For example, in some implementations, a network monitor 180 is a computing device such as the computing device 910 illustrated in FIG. 7 and described below. Each network monitor 180 is situated in, or in communication with, the network 110 with the ability to monitor, directly or indirectly, service level incidents ("SLI") that occur within the scope of the network 110. In some implementations, a network controller 146 reports service level incidents to the network monitor 180. In some implementations, communication participants, e.g., host nodes 160, report service level incidents to the network monitor 180. In some implementations, the network monitor 180 detects a service level incident. For example, in some such implementations, the network monitor 180 periodically transmits a probe packet (e.g., an Internet Control Message Protocol ("ICMP") packet) and uses characteristics of a network response to the probe packet to determine network status. The network monitor 180 records information representative of each SLI in one or more storage devices 188. In some implementations, each SLI is represented as a record in a data structure stored in the one or more stage devices 188 for analysis. In some implementations, each SLI is represented as an entry in a database, e.g., as a set of entries or table rows in a relational database. Records for each SLI may be stored in any appropriate format. In some implementations, the one or more storage devices 188 are internal to, or co-located with, the network monitor 180. In some implementations, the one or more storage devices 188 are external to the network monitor 180, e.g., as a separate data server, network attached storage ("NAS"), or storage area network ("SAN"). In some implementations, the network monitor 180 further includes a network analyzer 190.

The storage devices 188 is data storage either within the network monitor 180 or external to, but available to, the network monitor 180. The storage device 188 may include any device, or collection of devices, suitable for storing computer readable data. Suitable data storage devices include volatile or non-volatile storage, network attached storage ("NAS"), and storage area networks ("SAN"). A data storage device may incorporate one or more mass storage devices, which may be co-located or distributed. Devices suitable for storing data include semiconductor memory devices such as EPROM, EEPROM, SDRAM, and Flash memory devices. Devices suitable for storing data include magnetic disks, e.g., internal hard disks or removable disks, magneto optical disks, optical, and other such higher-capacity format disc drives. Data storage devices may be virtualized. Data storage devices may be accessed via an intermediary server and/or via a network. Data storage devices may structure data as a collection of files, data blocks, or chunks. Data storage devices may provide for error recovery using, for example, redundant storage and/or error recovery data (e.g., parity bits). The storage devices 188 may host a database, e.g., a relational database. In some implementations, data is recorded as entries in one or more database tables in a database stored in data storage. In some such implementations, the data is accessed using a query language such as the Structured Query Language ("SQL") or a variant such as PostgreSQL. The storage devices 188 may host a file storage system. Data may be stored structured as a knowledge base. Data may be stored in an encrypted form. Access to stored data may be restricted by one or more authentication systems.

In some implementations, an SLI may occur when communication through the network drops below a particular quality level. For example, an SLA may include minimum or maximum thresholds for average values of one or more network communication quality metrics such as throughput, bandwidth, latency, and so forth. Throughput is the amount of information, e.g., number of bits, that is transmitted over a portion of the network in a fixed period of time. Bandwidth is a maximum potential throughput, where the limitation is either physical or artificial (e.g., policy driven). Congestion occurs when network devices attempt to get more throughput than the available bandwidth can accommodate. Goodput is the throughput of information content, exclusive of other traffic such as network configuration data, protocol control information, or repeated transmission of lost packets. Latency is the amount of time that elapses between when a sender transmits a packet and the intended receiver processes the packet, i.e., the delay attributable to transmission. Lag is the result of delay, e.g., the perception of delays from the perspective of a communication participant. For example, lag may occur when latency exceeds some tolerance threshold, e.g., where the delay becomes noticeable to an end-user or fails to meet quality of service ("QoS") requirements for a communication protocol. Although lag may also occur when packets are lost or corrupted in transmission, it is generally treated as synonymous with latency. Latency (and lag) may be measured in terms of a one-way transmission or as a round-trip time for a packet transmission and a subsequent response or acknowledgement. In some instances, latency is measured as a function of path length, that is, the number of intermediary network devices ("hops") in a route. Each hop may contribute to the overall latency of the route, thus a path with a lower hop count is expected to have less latency and few opportunities for forwarding failures. Packet delay variation (i.e., transmission jitter) is variation in latency over time, e.g., where packets arrive in bursts or with inconsistent delay. Transmission errors may cause poor goodput, high latency or lag, and undesirable delay variation. Metrics of transmission error include counts of packet re-transmissions, ratios of packet re-transmissions to first-transmissions, and congestion-related transmissions such as packets with explicit congestion notification ("ECN") flags set. An SLI may be recorded for each such transmission error or when values for one or more metrics of transmission error surpass or fall below a corresponding threshold.

The network analyzer 190 is responsible for analysis of the SLI records identified by the network monitor 180. In some implementations, the network analyzer 190 is a component or module of a network monitor 180. In some implementations, the network analyzer 190 is a hardware device including one or more computing processors, memory devices, network interfaces, and connective circuitry. For example, in some implementations, the network analyzer 190 is a computing device such as the computing device 910 illustrated in FIG. 7 and described below. The network analyzer 190 reads the SLI records from the storage devices 188 and prioritizes the service level incidents represented. In some implementations, the network analyzer 190 identifies one or more particular service level incidents represented by the SLI records as high priority. A network administrator can then investigate the high priority incidents further and take action to address the root cause of the incidents.

Figure 2A:
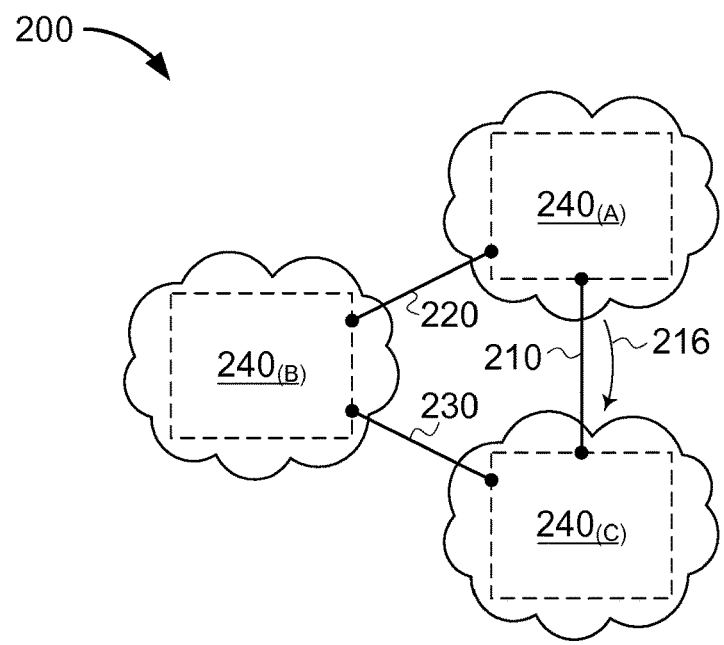
FIGS. 2A and 2B are block diagrams illustrating how communication may be redirected around a network failure.
Figure 2B:
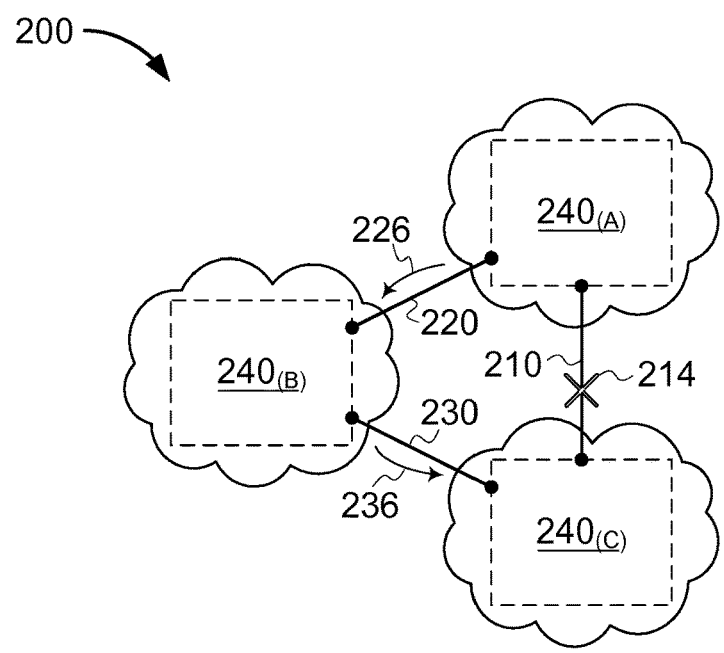

FIGS. 2A and 2B are block diagrams illustrating how communication may be redirected around a network failure 214. In some instances, an SLI may be the result of a seemingly unrelated network failure. For example, an SLI on a network link may be the result of over-subscription of the link caused by a failure on a different network link somewhere else within the network. FIGS. 2A and 2B illustrate this example.

In broad overview, FIGS. 2A and 2B illustrate a network environment 200 that includes three distinct network regions $240_{(A)}$, $240_{(B)}$, and $240_{(C)}$. The illustrated network environment 200 includes a data path $\overline{AC}$ 210 between regions $240_{(A)}$ and $240_{(C)}$, a data path $\overline{AB}$ 220 between regions $240_{(A)}$ and $240_{(B)}$, and a data path $\overline{BC}$ 230 between regions $240_{(B)}$ and $240_{(C)}$. The illustrated data paths 210, 220, and 230 are shown as single lines representing any form of network path, including, e.g., a single direct link, a plurality of links, a link aggregation, a network fabric, a network of links, and so forth. In FIG. 2A, data can flow 216 directly from network regions $240_{(A)}$ to $240_{(C)}$ via data path $\overline{AC}$ 210. However, in FIG. 2B, a failure 214 along the data path $\overline{AC}$ 210 blocks the flow 216 from region $240_{(A)}$ to region $240_{(C)}$.

In FIG. 2B, data from region $240_{(A)}$ to region $240_{(C)}$ flows through region $240_{(B)}$ to circumvent the failure 214. That is, the direct data flow 216 is replaced with a data flow 226 from region $240_{(A)}$ to region $240_{(B)}$ and a data flow 236 from region $240_{(B)}$ to region $240_{(C)}$. If the composite capacity of paths $\overline{AB}$ 220 and $\overline{BC}$ 230 (i.e., path $\overline{ABC}$) is equal to or greater than the capacity of failed path $\overline{AC}$ 210, then the failure 214 will not result in a service level incident ("SLI"). However, redirecting the traffic from region $240_{(A)}$ to region $240_{(C)}$ through region $240_{(B)}$ using the alternate path $\overline{ABC}$ may impact other traffic along one or both of the component paths $\overline{AB}$ 220 and $\overline{BC}$ 230, which could result in an SLI. For example, if each path 210, 220, and 230 has the same capacity and is at the same utilization rate, then the failure 214 would double the utilization rate of path $\overline{ABC}$ (paths 220 and 230). If that rate is initially above 50%, then doubling the rate will exceed the capacity and result in an SLI.

If the resulting load on a network path is close to capacity, there may be an SLI for later added traffic. Even if the initial utilization of one of the paths was comparatively low, if the resulting combined load exceeds the capacity of a data path, there will likely be an SLI. For example, if the combined load on network path $\overline{BC}$ 230 is close to full utilization after redirecting traffic around the failure 214, then later added traffic from region $240_{(B)}$ to region $240_{(C)}$ will fail along network path $\overline{BC}$ 230. The resulting SLI record will be associated with traffic along the network path $\overline{BC}$ 230. However, the actual root cause is the failure 214 along the network path $\overline{AC}$ 210.

The situation illustrated in FIGS. 2A and 2B is simplified. In practice, the traffic routed around a failure will impact a variety of alternate paths and trigger service level incidents in potentially unexpected places. But analysis of SLI records in the aggregate can help identify an underlying cause. Accordingly, in some implementations, the network analyzer 190 will look for sets of service level incidents on various paths that indicate—in the aggregate—where remediation action is warranted. In some implementations, the network analyzer 190 identifies correlated incidents associated with different services, such that the cause is more likely to be the network rather than a cause related more directly to the service itself.

In some instances, a service level incident ("SLI") occurs when contents of a packet in a flow cannot be propagated through a network or a portion of a network, or when contents of a packet in a flow are not propagated in a manner satisfying one or more network quality metrics. For example, an SLI may occur where network resources cannot be allocated for a flow, when a network flow experiences congestions, or when values for one or more network communication metrics are surpass or fall below a corresponding threshold. A service level agreement ("SLA") may allow for a certain number of incidents, or a certain aggregate impact of incidents, during a particular measurement period. For example, an SLA may tolerate interruption or rejection of up to 1% of flows on a weekly basis. In some implementations, a period has fixed start and end times, e.g., a week may be defined as Sunday morning at midnight to the following Saturday night at 23:59. In some implementations, a period is a sliding window of time, e.g., a week may be defined as a window of 7 consecutive days or any window of 168 hours. In some implementations, the measurement period can be a discrete block of time or a sliding window of time, as specified by the SLA. The incidence tolerance for a measurement period is reduced with each incidence occurrence. That is, when an incident occurs, the remaining incidence tolerance for the measurement period encompassing the incident is reduced by the impact of the incident. If an SLA allows for, or tolerates, 10 hours of downtime per month, then 2 hours of downtime leaves a remaining incidence tolerance of 8 hours for the remainder of the month. If an SLI exceeds the incidence tolerance for an SLA, then the SLI is an SLA violation.

In some implementations, of two comparable incidents that are similar in importance or network impact, where one SLI has more impact on a remaining tolerance limit for an SLA than another SLI, the SLI with the greater impact on the remaining tolerance limit is prioritized over the other SLI. In some implementations, an SLI that results in a remaining tolerance limit for an SLA falling below a threshold is treated as a more severe incident than a comparable SLI that does not result in a remaining tolerance limit for an SLA falling below the threshold. In some implementations, where an SLI has more impact on a remaining tolerance limit for an SLA than another SLI, the SLI with the greater impact on the remaining tolerance limit is prioritized over the other SLI even if other factors might suggest prioritizing the other SLI, e.g., based on importance or network impact. In some implementations, multiple factors are used in identifying which SLI to prioritize. For example, FIG. 5, discussed below, illustrates an example of using multiple filters to identify a set of priority incidents.

FIGS. 3A and 3B are example tables representative of service level incidents. In some implementations, service level incidents are represented by network incident records. In some implementations, a network incident record includes only enough information to identify the corresponding incident. In some implementations, a network incident record includes additional information, e.g., information that may be helpful in later diagnostics. In some implementations, a network incident record includes at least time and date information for an incident occurrence, route information for the incident occurrence, and a description or classification for a service impacted by the incident occurrence.

FIG. 3A illustrates an example of a table 300 of service level incident ("SLI") records in which each SLI is represented by a respective row 372 containing data entries for an impacted flow (e.g., a flow for which no route could be allocated, or for which a route that had been allocated became unavailable). As shown, each row 372 includes data entries for a source 312 and destination 316 of the impacted flow, a service level objective ("SLO") 322 and a service identifier 332 for the service supported by the impacted flow, and an event time 352 for when the flow was impacted. The source 312 and destination 316 are represented by identifiers for the participating ends of the flow, e.g., network addresses, network names, address ranges, domain names, or any other such identifiers. The SLO 322 is represented by an identifier for the SLO, e.g., a name or number. In some implementations, the SLO 322 name is a descriptive character string. In some implementations, the SLO 322 name is a group classification identifier. In some implementations, the SLO 322 name is a descriptive characteristic of the objective, e.g., a maximum incidence tolerance level. The service identifier 332 identifies the service, or service group, impacted by the SLI. For example, if the flow is associated with a particular service hosted by one or more host nodes 160, the service identifier 332 can be a character string identifying the service. The event time 352 is a timestamp indicating when the SLI occurred, or when the SLI record was entered (which may generally correspond with when the SLI occurred, but might not be the exact precise moment thereof). Although shown as a single table 300, the information represented in FIG. 3A may be stored as multiple tables or in a non-relational database structure. The table 300 is provided as an example of how service level incidents may be represented in data storage 188; alternative data structures are used in some implementations.

FIG. 3B illustrates an example table 305 representative of aggregations of service level incident records. In the example table 305, each set of SLI records is represented by a respective row 374 containing aggregate data entries corresponding to SLI records for various impacted flows (e.g., as represented in the table 300 shown in FIG. 3A). As shown, each row 374 includes data entries for a source region 314 and destination region 318 of the flows impacted by one or more of the represented sets of incidents, an aggregate SLO level 324 and an aggregate service or service classification identifier 334 for the for the services supported by the impacted flows, a count 340 of SLI records in the set, and an event time range start 354 and end 356 for when the flows were impacted. The source 314 and destination 318 ranges are represented by identifiers for the participating ends of the flows, e.g., network addresses, network names, address ranges, domain names, or any other such identifiers. The SLO level 324 is represented by an identifier for a generalization of the SLO, e.g., a name or number. In some implementations, the represented set of SLI may have the same SLO, in which case the SLO level 324 can be equivalent to the SLO 322. In some implementations, the represented set of SLI may have a shared SLO characteristic, and the shared SLO characteristic is used as the SLO level 324. In some implementations, the SLO level 324 is a generalization of the objectives for the flows represented by the set. Likewise, the service or service class identifier 334 identifies the service, or service group, impacted by the represented SLIs. In some implementations, the table 305 may be sorted by the count 340. The event time range start 354 and 356 are timestamps bookending the timestamps 352 for the represented set of incidents. Although shown as a single table 305, the information represented in FIG. 3B may be stored as multiple tables or in a non-relational database structure. The table 305 is provided as an example of how sets of service level incidents may be represented in data storage 188; alternative data structures are used in some implementations.

In some implementations, the data represented in the table 305 shown in FIG. 3B is generated by applying one or more filters or aggregation queries to the data represented in the table 300 shown in FIG. 3A. For example, in some implementations, a query is used to identify similar SLIs happening within a particular time range along various network corridors, where a network corridor is a group of network paths between two end node collections or regions. A network corridor may be characterized, for example, by parallel network paths, shared network paths, collaborative network paths, link aggregations, and other such redundancies. The ends of a network corridor may be geographic regions, network service regions, co-located computing devices, data centers, proximate address ranges, etc. In some implementations, the network analyzer 190 uses a pair of network address sets to represent a network corridor, where each of the sets of network addresses identifies or defines end nodes for the respective end of the network corridor.

A query, or set of queries, can be used to identify SLI records for frequently occurring incidents impacting disparate services along a particular network corridor which may indicate a problem in that network corridor. In some implementations, a network analyzer 190 identifies sets of SLI records with a count 340 above some minimal threshold, which may be, for example, a preconfigured number or percentage.

Figure 4:
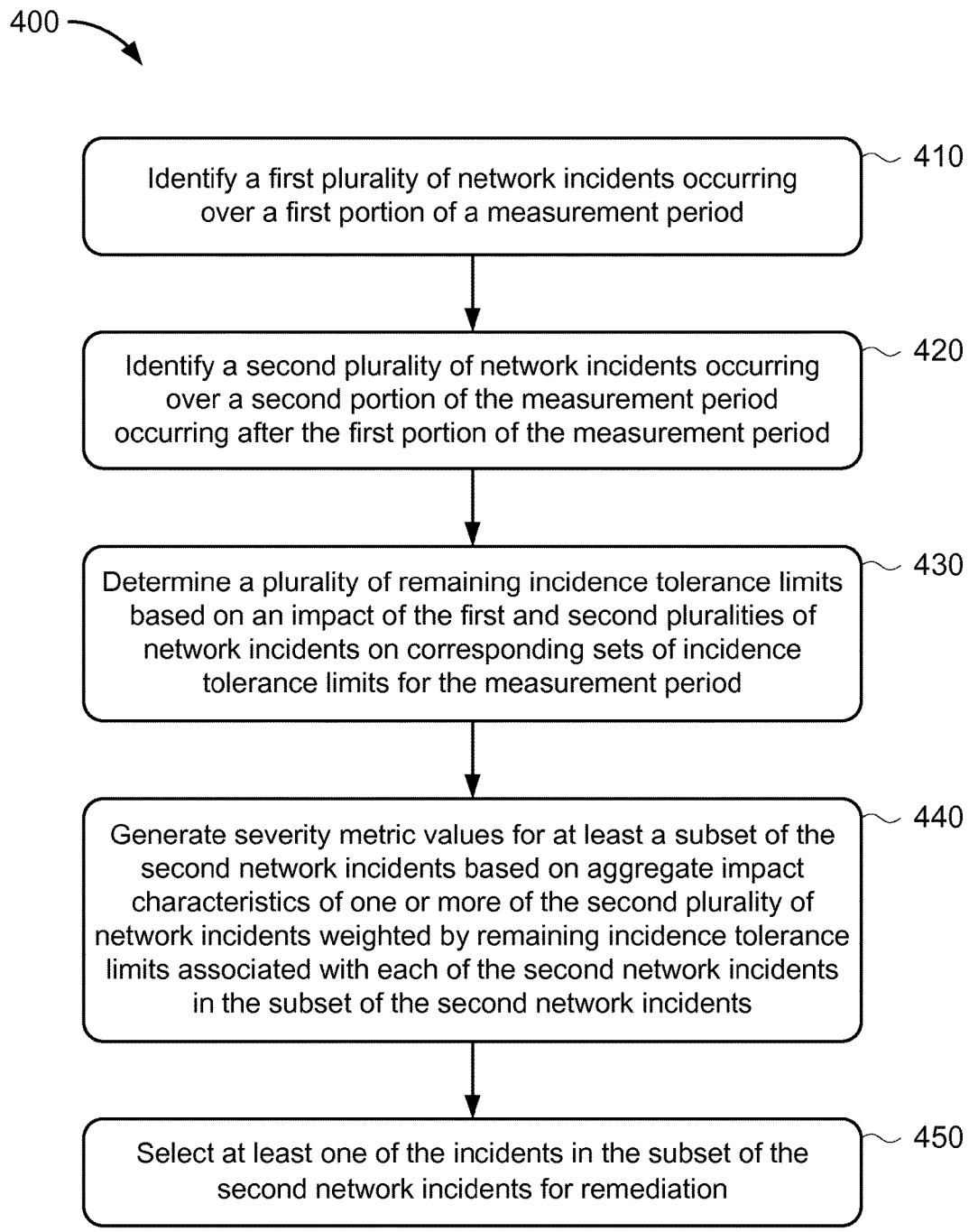
FIG. 4 is a flowchart illustrating an example method for maintaining network service levels.

FIG. 4 is a flowchart illustrating an example method 400 for maintaining network service levels. In broad overview of the method 400, a network analyzer 190 identifies, at stage 410, a first plurality of network incidents occurring over a first portion of a measurement period. At stage 420, the network analyzer 190 identifies a second plurality of network incidents occurring over a second portion of the measurement period occurring after the first portion of the measurement period. At stage 430, the network analyzer 190 determines a plurality of remaining incidence tolerance limits based on an impact of the first and second pluralities of network incidents on corresponding sets of incidence tolerance limits for the measurement period. At stage 440, the network analyzer 190 generates severity metric values for at least a subset of the second network incidents based on aggregate impact characteristics of one or more of the second plurality of network incidents weighted by remaining incidence tolerance limits associated with each of the second network incidents in the subset of the second network incidents. And at stage 450, the network analyzer 190 selects at least one of the incidents in the subset of second network incidents for remediation.

Figure 5:
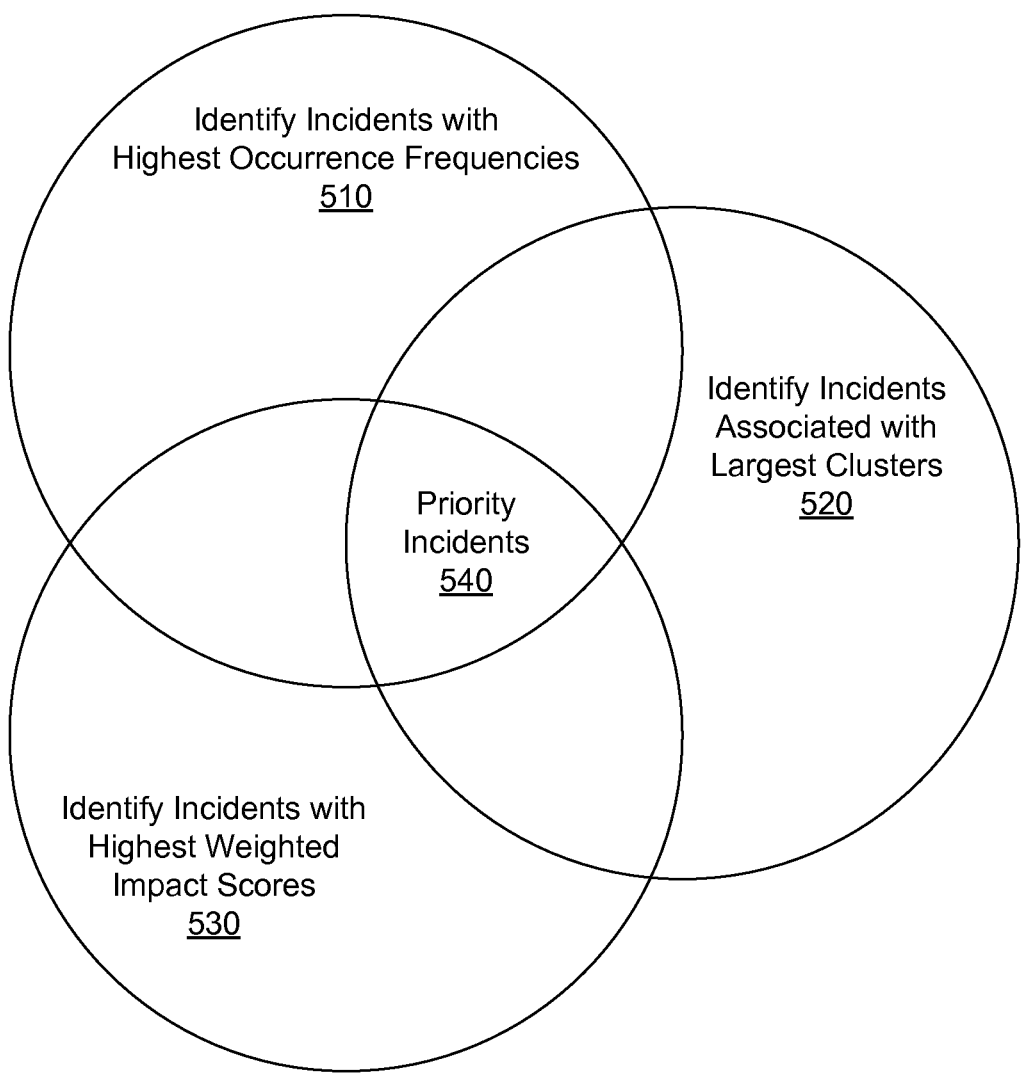
FIG. 5 is a Venn diagram illustrating a filter intersection for prioritizing incidents.

Referring to FIG. 4 in more detail, at stage 410, a network analyzer 190 identifies a first plurality of network incidents occurring over a first portion of a measurement period. The network analyzer 190 identifies the network incidents by accessing records stored by the network monitor(s) 180 in the data storage 188. In some implementations, the network analyzer 190 queries the data storage 188 to identify and/or retrieve SLI records for incidents occurring during the first portion of the measurement period. In some implementations, the network analyzer 190 uses a query (e.g., a SQL query) to identify the records while simultaneously filtering out or aggregating the records according to criteria limiting the scope of the analysis. For example, the criteria may eliminate records for incidents that occurred in apparent isolation or are for unrelated services. In some implementations, the criteria restricts the identified records to a particular network corridor. In some implementations, the criteria identifies clusters of incidents, e.g., in time, geography, or network topology. In some implementations, the query only return record sets for records of incidents that happened more than a threshold number of times during the first portion of the measurement period. In some implementations, multiple queries or filters are used to identify incident records for inclusion in the first plurality of network incidents. FIG. 5, presented below, illustrates a Venn diagram for identifying a set of priority incidents 540 using a combination of queries or filters 510, 520, and 530.

Referring still to stage 410 of FIG. 4, the first portion of the measurement period provides historical context for analysis of events in later portions of the measurement period, e.g., a second portion of the measurement period. The first portion of the measurement period may be, for example, a time period beginning with the beginning of the measurement period and ending at a percentage of the measurement period, e.g., halfway through or sixty-seven percent of the measurement period. The first portion may be, for example a time period beginning with the beginning of the measurement period and ending at the time of the access to the data storage 188 in stage 410. In some implementations, the first portion of time starts with the beginning of the measurement period and ends at the start of a second portion of time that, in turn, ends at the end of the measurement period or at the time of the last service level incident. In some such implementations, the end of the first portion of time is an offset from the end of the measurement period, e.g., such that the second portion of time is a fixed length such as the last six hours of the measurement period or such that the second portion of time is a preconfigured percentage of the measurement period such as the last ten percent of the measurement period. In some implementations, the end of the first portion of time is selected to make the second portion of time be the shorter of a fixed length of time or a preconfigured percentage of the measurement period. That is, for example, in some implementations the first portion of time ends six hours before the end of the measurement period or at ninety-percent of the measurement period, whichever is shorter (where six hours and ninety-percent are example numbers—other lengths may be also suitable).

At stage 420, the network analyzer 190 identifies a second plurality of network incidents occurring over a second portion of the measurement period occurring after the first portion of the measurement period. The network analyzer 190 identifies the network incidents by accessing records stored by the network monitor(s) 180 in the data storage 188. In some implementations, the network analyzer 190 queries the data storage 188 to identify and/or retrieve SLI records for incidents occurring during the second portion of the measurement period. In some implementations, the network analyzer 190 uses a query (e.g., a SQL query) to identify the records according to criteria limiting the scope of the analysis. For example, the criteria may select for records of incidents related to, or associated with, the incidents identified in stage 410. In some implementations, the network analyzer 190 uses the same queries and filters used in stage 410, applied to the second portion of the measurement period.

In some implementations, the second portion of the measurement period is contiguous with the first portion of the measurement period, as described above. The second portion of the measurement period may be, for example, a time period beginning with the end of the first period and ending at the end of the measurement period. The second portion may be, for example a time period beginning with the end of the first period and ending at the time of the time of the access to the data storage 188 in stage 420. In some implementations, the second portion overlaps with, or encompasses, the first portion. In general, the first portion of the measurement period provides context for analysis of network performance during the second portion of the measurement period. Service level incidents occurring during the second portion of the measurement period can then be identified in comparison to the context provided by the first portion, or the first and second portion, of the measurement period.

At stage 430, the network analyzer 190 determines a plurality of remaining incidence tolerance limits based on an impact of the first and second pluralities of network incidents on corresponding sets of incidence tolerance limits for the measurement period. For each SLA impacted by the service level incidents in the first and second pluralities of network incidents, the network analyzer 190 identifies a corresponding incidence tolerance limit and an impact on that corresponding incidence tolerance limit, e.g., a resulting remaining incidence tolerance limit for the measurement period.

At stage 440, the network analyzer 190 generates severity metric values for at least a subset of the second network incidents based on aggregate impact characteristics of one or more of the second plurality of network incidents weighted by remaining incidence tolerance limits associated with each of the second network incidents in the subset of the second network incidents. Each SLI may be assigned a score representing a severity of the incident according to one or more metrics. In some implementations, the metrics account for a count of corresponding incidents during the measurement period. In some implementations, the metrics include a prioritization value associated with the impacted network path. In some implementations, the metrics assign different values to different services, e.g., assigning a higher severity score to incidents impacting higher priority services. The score value, i.e., the severity metric value, is then adjusted, i.e., weighted, by a factor representing the corresponding remaining incidence tolerance limit for the SLA impacted by the incident. In some implementations, the weighting factor increases as the remaining incidence tolerance limit approaches zero. In some implementations, the severity metrics include an incident frequency for the measurement period.

At stage 450, the network analyzer 190 selects at least one of the incidents in the subset of second network incidents for remediation. In some implementations, the network analyzer 190 identifies one or more incidents with severity metric values above a threshold. In some implementations, the network analyzer 190 identifies one or more incidents with severity metric values in an upper percentile (e.g., upper $75^{th}$ percentile or upper $90^{th}$ percentile, etc.). In some implementations, the network analyzer 190 identifies one or more incidents with the highest severity metric values for incidents occurring within the second portion of the measurement period. In some implementations, remediation of an incident with a high severity metric value is more likely to improve overall network conditions than remediation of lower ranked incidents.

FIG. 5 is a Venn diagram illustrating a filter intersection for prioritizing incidents. In some implementations of the method 400, the network analyzer 190 selects incidents in the subset of second network incidents for remediation based on a plurality of incident filters. As shown in FIG. 5, in some implementations, the network analyzer 190 identifies a ranked set of high priority incidents by identifying the intersection 540 of filters 510, 520, and 530. A first filter 510 identifies incidents with the highest occurrence frequencies, e.g., using one or more queries of the service level incident records stored in storage 188. In some implementations, the queries select aggregations of similar incidents and sorts them by a respective count of incidents in each aggregate. A second filter 520 identifies incidents associated with the largest clusters. For example, in some implementations, incidents are clustered by shared or similar attributes. In some implementations, incidents are clustered by impacted network links, routes, end nodes, or end node regions, such that the resulting clusters group together incidents impacting the same network corridor. The clustering filter 520 identifies the largest clusters and allows the network analyzer 190 to prioritize incidents associated with the largest clusters. A third filter 530 identifies incidents with the highest weighted impact scores. In some implementations, incidents are assigned a value for one or more impact metrics measuring the impact of the incident on network quality. The values are weighted by one or more factors, including, for example, a remaining tolerance level for a corresponding service level objective or service level agreement. In some implementations, the network analyzer 190 identifies a set of priority incidents based on the intersection 540 of these filters 510, 520, and 530. In some implementations, other filters are used. In some implementations, additional filters are used.

In some implementations, the network analyzer 190 generates a report identifying the selected network incidents. In some implementations, the report is provided to one or more system operators by e-mail, SMS text message, automated telephone call, instant message, or any other available medium for communication.

Figure 6:
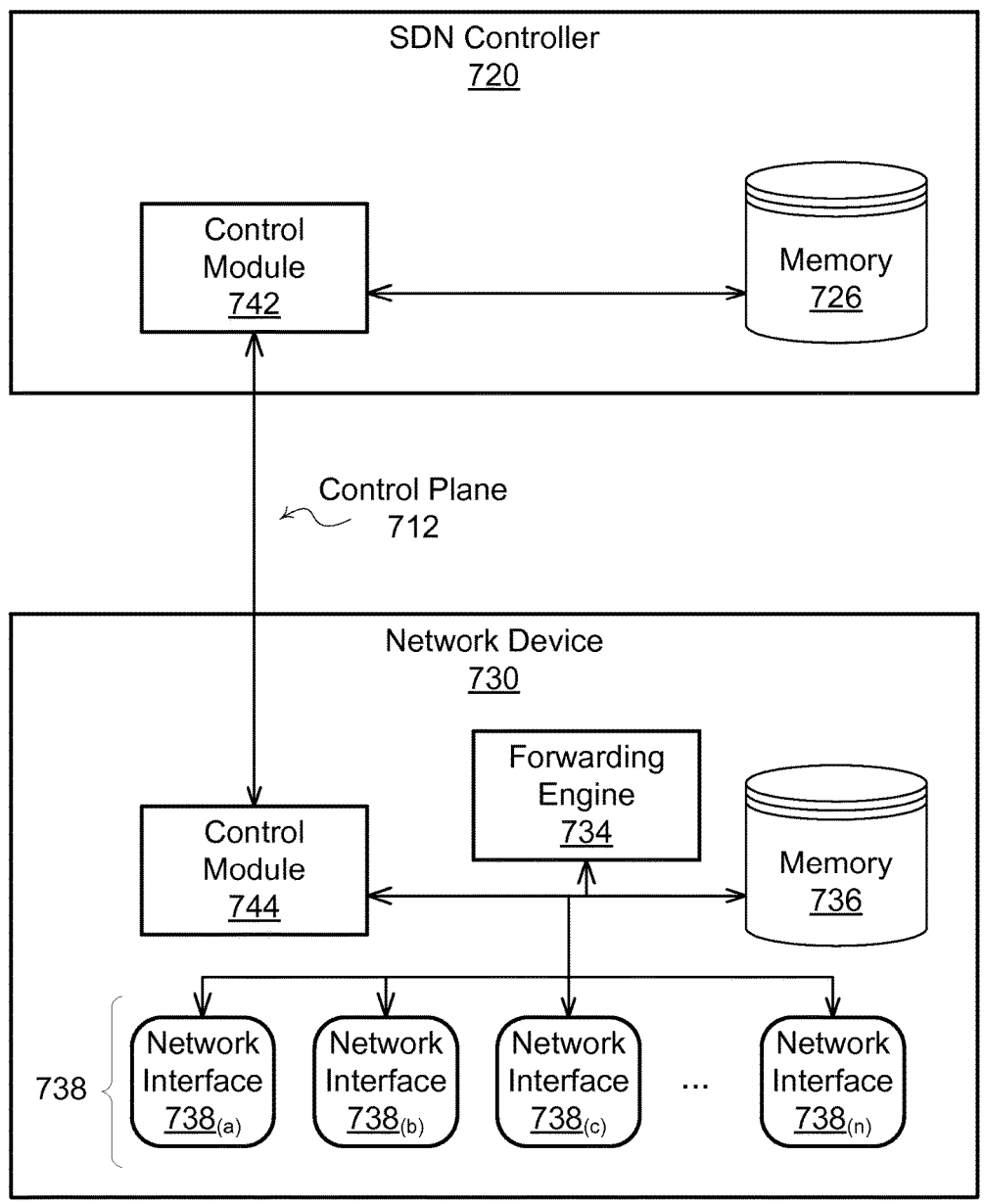
FIG. 6 is a block diagram of a network device suitable for use in the various implementations described.

FIG. 6 is a block diagram of an example network device 730. The example network device 730 is suitable for use in implementing the intermediary network devices described herein, in accordance with an illustrative implementation. The computing system 910, described below in reference to FIG. 7, may also be suitable as a network device 730. For example, with network function virtualization ("NFV"), some network functionality normally implemented in hardware circuitry is implemented as software executing on a processor (e.g., a general purpose processor). In broad overview, the network device 730 includes a control module 744 and memory 736, e.g., for storing device configuration and routing data. The network device 730 includes a forwarding engine 734 that uses the device configuration and routing data stored in memory 736 to manage data traffic at network interfaces 738. In some implementations, the network device 730 is implemented for use in a software-defined network ("SDN"), where the network device 730 is controlled by an external SDN controller 720, e.g., via a control plane link 712. The SDN controller 720 includes a control module 742 and memory 726. The computing system 910, described below in reference to FIG. 7, may also be suitable as an SDN controller 720. In some implementations, one or more functional components of the network device 730 or SDN controller 720 are implemented as software components executed by a general-purpose processor.

Referring to FIG. 6, in more detail, the network device 730 includes a set of network interfaces 738. Each network interface 738 may be connected by one or more links to one or more external devices, forming a network (e.g., the network 110 shown in FIG. 1). External devices send data packets to the network device 730, via these links, arriving via an ingress interface (e.g., network interface $738_{(a)}$). The network device 730 forwards received data packets to an appropriate next-hop via an egress interface (e.g., network interface $738_{(c)}$). In some implementations, the forwarding engine 734 determines which network interface 738 to use for forwarding each data packet received.

The forwarding engine 734 uses configuration and routing data in memory 736 to manage the data traffic at network interface ports 738. The configuration and routing data in memory 736 are controlled by the control module 744. In some implementations, the forwarding engine 734 updates packet headers before forwarding packets to an egress network interface 738. For example, the forwarding engine 734 may update ECN, TTL, or checksum information in packet headers. In some implementations, an incoming packet contains routing instruction embedded in a header of the incoming packet and the forwarding engine 734 forwards the packet based on the embedded instructions.

The memory 736 may be any device suitable for storing computer readable data. Examples include, but are not limited to, semiconductor memory devices such as EPROM, EEPROM, SRAM, and flash memory devices. In some implementations, the memory 736 of a network device 730 includes memory dedicated to storing patterns for identifying packet flows, e.g., as ternary content-addressable memory ("TCAM"). In some implementations, the memory 736 of a network device 730 includes memory dedicated to buffering packet flows as they traverse the network device 730. A network device 730 may have any number of memory devices 736.

The control module 744 manages the performance of the network device 730. In some implementations, the control module 744 receives instructions from an external control device. For example, in a software-defined network ("SDN"), the control module 744 may receive control instructions from an SDN controller 720 external to the network device 730. In some implementations, the control module 744 processes route-information packets (i.e., control plane packets) and updates the memory 736 with modifications to routing tables used by the forwarding engine 734. In some implementations, the control module 744 reads data arriving at an egress interface 738 into a buffer stored in memory 736. The control module 744 may be implemented using a general purpose processor or special purpose logic circuitry, e.g., an application specific integrated circuit ("ASIC").

FIG. 7 is a block diagram of an example computing system 910. The example computing system 910 is suitable for use in implementing the computerized components described herein, in accordance with an illustrative implementation. In broad overview, the computing system 910 includes at least one processor 950 for performing actions in accordance with instructions and one or more memory devices 970 or 975 for storing instructions and data. The illustrated example computing system 910 includes one or more processors 950 in communication, via a bus 915, with memory 970, at least one network interface controller 920 with network interface 922 for connection to a network device 924 (e.g., for access to a network), and other components 980, e.g., input/output ("I/O") components 930. Generally, the processor(s) 950 will execute instructions received from memory. The processor(s) 950 illustrated incorporate, or are directly connected to, cache memory 975. In some instances, instructions are read from memory 970 into cache memory 975 and executed by the processor(s) 950 from cache memory 975.

In more detail, the processor(s) 950 may be any logic circuitry that processes instructions, e.g., instructions fetched from the memory 970 or cache 975. In many embodiments, the processor(s) 950 are microprocessor units or special purpose processors. The computing device 910 may be based on any processor, or set of processors, capable of operating as described herein. The processor(s) 950 may be single core or multi-core processor(s). The processor(s) 950 may be multiple distinct processors. In some implementations, the processor(s) 950 are implemented as circuitry on one or more "chips."

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto-optical disks, and optical discs (e.g., CD ROM, DVD-ROM, or Blu-Ray® discs). A computing system 910 may have any number of memory devices 970.

The cache memory 975 is generally a form of computer memory placed in close proximity to the processor(s) 950 for fast access times. In some implementations, the cache memory 975 is part of, or on the same chip as, the processor(s) 950. In some implementations, there are multiple levels of cache 975, e.g., L2 and L3 cache layers.

The network interface controller 920 manages data exchanges via the network interface 922 (sometimes referred to as a network interface port). The network interface controller 920 handles the physical and data link layers of the OSI model for network communication. In some implementations, some of the network interface controller's tasks are handled by one or more of the processor(s) 950. In some implementations, the network interface controller 920 is incorporated into the processor 950, e.g., as circuitry on the same chip. In some implementations, a computing system 910 has multiple network interfaces 922 controlled by a single controller 920. In some implementations, a computing system 910 has multiple network interface controllers 920. In some implementations, each network interface 922 is a connection point for a physical network link (e.g., a cat-5 Ethernet link). In some implementations, the network interface controller 920 supports wireless network connections and an interface 922 is a wireless (e.g., radio) receiver/transmitter (e.g., for any of the IEEE 802.11 protocols, near field communication "NFC", BLUETOOTH, BLE, ANT, or any other wireless protocol). In some implementations, the network interface controller 920 implements one or more network protocols such as Ethernet. Generally, a computing device 910 exchanges data with other computing devices via physical or wireless links through a network interface 922. The network interface 922 may link directly to another device or to another device via an intermediary device, e.g., a network device such as a hub, a bridge, a switch, or a router, connecting the computing device 910 to a data network such as the Internet.

The computing system 910 may include, or provide interfaces for, one or more input or output ("I/O") components 930. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

The other components 980 may include an I/O interface, external serial device ports, and any additional co-processors. For example, a computing system 910 may include an interface (e.g., a universal serial bus ("USB") interface) for connecting input devices, output devices, or additional memory devices (e.g., portable flash drive or external media drive). In some implementations, a computing device 910 includes an additional device 980 such as a co-processor. For example, a math co-processor can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible and stores data, e.g., computer-executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method of maintaining network service levels, the method comprising:
   identifying a first plurality of network incidents occurring over a first portion of a measurement period;
   identifying a second plurality of network incidents occurring over a second portion of the measurement period occurring after the first portion of the measurement period;
   determining, for each of a set of incidence tolerance limits, a remaining incidence tolerance limit for the measurement period by subtracting respective impacts of the first and second pluralities of network incidents on the incidence tolerance limit from the incidence tolerance limit;
   generating, for each of at least a subset of the second network incidents, a severity metric value based on an aggregation of weighted impacts of the second network incidents on one or more of the remaining incidence tolerance limits, wherein the weighting applied to the impact of the second network incident on the one or more remaining incidence tolerance limits increases as the respective remaining incidence tolerance limit approaches zero; and
   selecting at least one of the incidents in the subset of the second network incidents for remediation based on a comparison of the severity metric values.

2. The method of claim 1, wherein the identified first plurality and second plurality of network incidents are represented by network incident records stored in computer-readable memory.

3. The method of claim 2, wherein a network incident record includes at least:
   (i) time and date information for an incident occurrence,
   (ii) route information for the incident occurrence, and
   (iii) a description or classification for a service impacted by the incident occurrence.

4. The method of claim 1, comprising limiting the subset of the second network incidents to network incidents satisfying a selection criteria.

5. The method of claim 4, comprising selecting the subset of the second network incidents based on a count of network incidents satisfying the selection criteria exceeding a threshold value.

6. The method of claim 1, comprising limiting the subset of the second network incidents to network incidents impacting network flows that each have at least one respective end node within a shared geographic region.

7. The method of claim 1, comprising selecting the subset of the second network incidents, wherein selecting the subset of second network incidents comprises identifying a network incident impacting a network flow between a first end node and a second end node based on the first end node having a network address within a first set of network addresses and the second end node having a network address within a second set of network addresses.

8. The method of claim 7, comprising selecting the first set of network addresses and the second set of network addresses based on a shared network link between nodes addressed within the first set of network addresses and nodes addressed within the second set of network addresses.

9. The method of claim 1, wherein the measurement period is a rolling window of time.

10. The method of claim 1, wherein the impact of the first and second pluralities of network incidents corresponds to a total duration of the first and second pluralities of network incidents, and the incidence tolerance limit is a maximum aggregate impact of network incidents allowed over the measurement period.

11. A system for maintaining network service levels, the system comprising:
    a computer-readable memory storing records of network incidents; and
    one or more processors configured to access the computer-readable memory and to execute instructions that, when executed by a processor, cause the processor to:
       identify, using the records of network incidents stored in the computer-readable memory, a first plurality of network incidents occurring over a first portion of a measurement period;
       identify a second plurality of network incidents occurring over a second portion of the measurement period occurring after the first portion of the measurement period;
       determine, for each of a set of incidence tolerance limits, a remaining incidence tolerance limit for the measurement period by subtracting respective based on an impacts of the first and second pluralities of network incidents on the incidence tolerance limit from the incidence tolerance limit;
       generate, for each of at least a subset of the second network incidents, a severity metric value based on an aggregation of weighted impacts of the second network incidents on one or more of the remaining incidence tolerance limits, wherein the weighting applied to the impact of the second network incident on the one or more remaining incidence tolerance limits increases as the respective remaining incidence tolerance limit approaches zero; and
       select at least one of the incidents in the subset of the second network incidents for remediation based on a comparison of the severity metric values.

12. The system of claim 11, wherein the identified first plurality and second plurality of network incidents are represented by network incident records stored in the computer-readable memory.

13. The system of claim 12, wherein a network incident record includes at least:
    (i) time and date information for an incident occurrence,
    (ii) route information for the incident occurrence, and
    (iii) a description or classification for a service impacted by the incident occurrence.

14. The system of claim 11, wherein the instructions, when executed by the processor, cause the processor to limit the subset of the second network incidents to network incidents satisfying a selection criteria.

15. The system of claim 14, wherein the instructions, when executed by the processor, cause the processor to select the subset of the second network incidents based on a count of network incidents satisfying the selection criteria exceeding a threshold value.

16. The system of claim 11, wherein the instructions, when executed by the processor, cause the processor to limit the subset of the second network incidents to network incidents impacting network flows that each have at least one respective end node within a shared geographic region.

17. The system of claim 11, wherein the instructions, when executed by the processor, cause the processor to select the subset of the second network incidents, wherein selecting the subset of second network incidents comprises identifying a network incident impacting a network flow between a first end node and a second end node based on the first end node having a network address within a first set of network addresses and the second end node having a network address within a second set of network addresses.

18. The system of claim 17, wherein the instructions, when executed by the processor, cause the processor to select the first set of network addresses and the second set of network addresses based on a shared network link between nodes addressed within the first set of network addresses and nodes addressed within the second set of network addresses.

19. The system of claim 11, wherein the measurement period is a rolling window of time.

20. The system of claim 11, wherein the impact of the first and second pluralities of network incidents corresponds to a total duration of the first and second pluralities of network incidents, and the incidence tolerance limit is a maximum aggregate impact of network incidents allowed over the measurement period.

* * * * *

UNITED STATES PATENT AND TRADEMARK OFFICE
CERTIFICATE OF CORRECTION

PATENT NO. : 10,277,487 B2
APPLICATION NO. : 14/879655
DATED : April 30, 2019
INVENTOR(S) : Deepak Kakadia et al.

It is certified that error appears in the above-identified patent and that said Letters Patent is hereby corrected as shown below:

In the Claims

Claim 11, Column 20, Line 31, should read as follows:
measurement period by subtracting respective "based on an" impacts of the first and second pluralities of Signed and Sealed this
Sixth Day of August, 2019

Andrei Iancu
*Director of the United States Patent and Trademark Office*